Dec. 31, 1929.                R. W. JOHNSON                1,741,314
                         ANTITHEFT SPARE WHEEL DEVICE
                           Filed Nov. 26, 1923         2 Sheets-Sheet 1
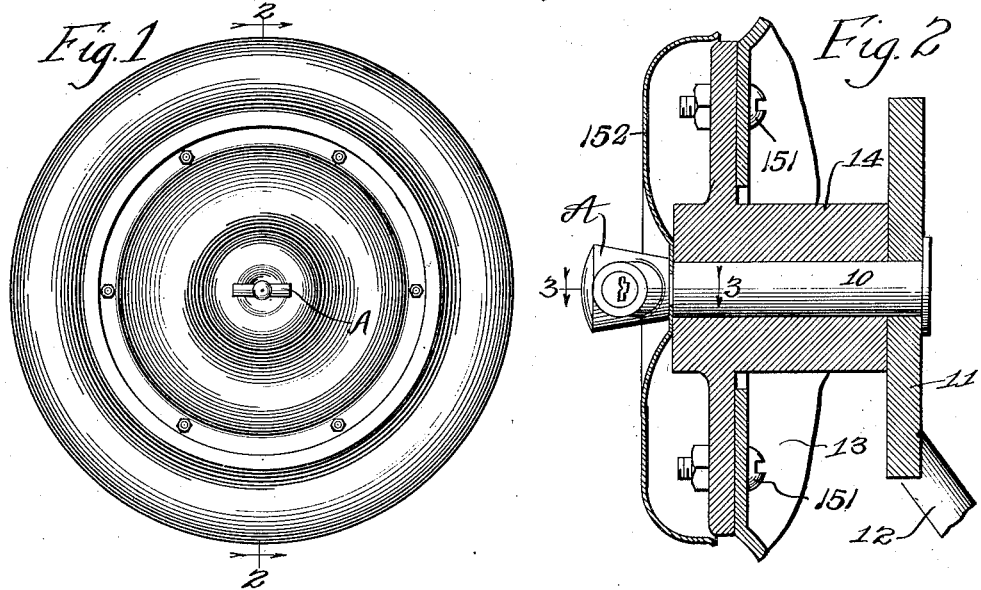
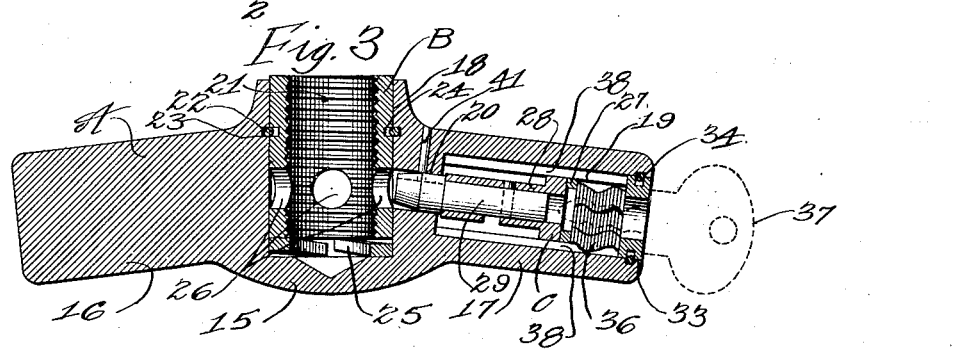
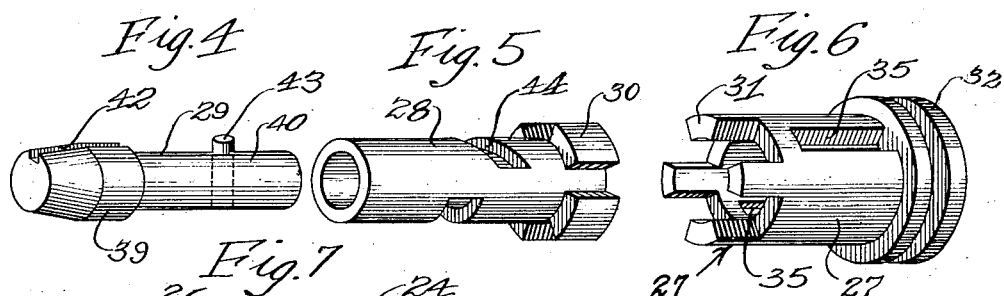
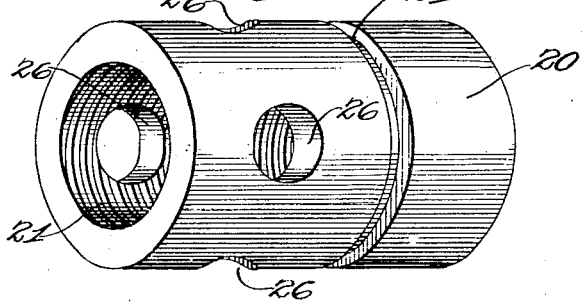
Inventor
Ray. W. Johnson
By George I. Haight
    His Atty.

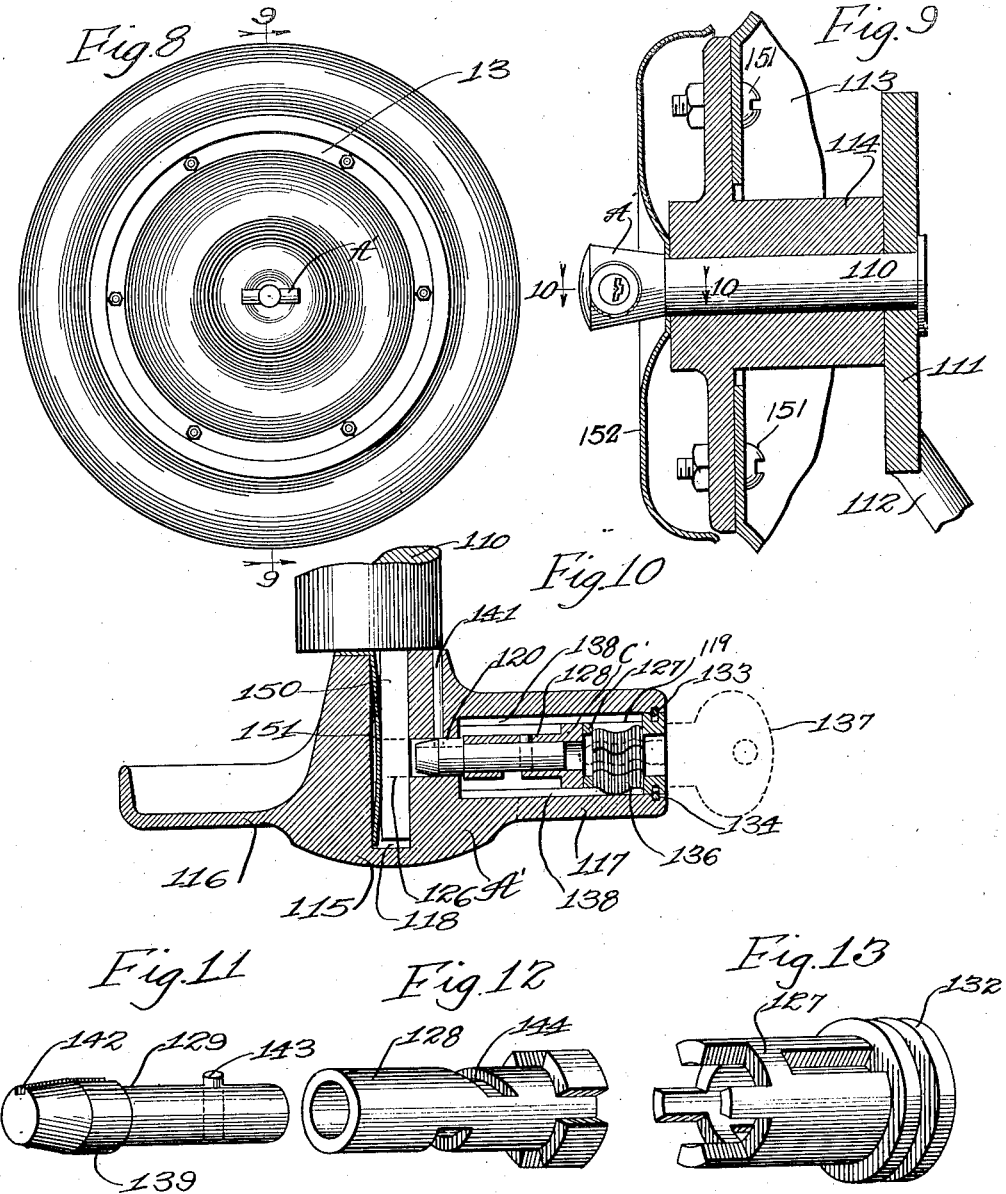

Patented Dec. 31, 1929

1,741,314

UNITED STATES PATENT OFFICE

RAY W. JOHNSON, OF CHICAGO, ILLINOIS

ANTITHEFT SPARE-WHEEL DEVICE

Application filed November 26, 1923. Serial No. 676,883.

This invention relates to improvements in anti-theft spare wheel device.

It is a common practice for automobilists to carry a complete spare wheel with a rim and tire thereon ready to be placed on the vehicle to replace one of the wheels in use in the event of puncture of a tire, such spare wheel being generally mounted on a shaft or dummy spindle permanently secured in place on the rear of the automobile body. Much annoyance and many losses are frequently occasioned by theft of such spare wheels, particularly in large cities when the automobile is parked unprotected for any length of time.

The principal object of my invention is to provide a relatively inexpensive, simple and thoroughly effective device which will prevent the unauthorized removal of the spare wheel from its usual mounting on the dummy spindle permanently secured to the automobile body.

A specific object of my invention is to provide a device of the character indicated which will be adapted to be secured to the outer end of the dummy spindle and locked in such a manner as to prevent detachment thereof and which can only be removed by the use of a particular key in possession of the automobile owner.

Other objects and advantages of the invention will more clearly appear from the description and claims hereinafter following.

In the drawings forming a part of this specification, Figure 1 is an elevational view of a spare wheel mounted in the customary manner on the dummy spindle permanently secured to the back or any other suitable part of an automobile body and illustrating my invention in connection therewith. Figure 2 is a vertical, sectional view, on an enlarged scale, taken substantially on the line 2—2 of Figure 1 with the wheel and other parts partly broken away. Figure 3 is a still further enlarged sectional view taken diametrically through the anti-theft device. Figures 4, 5 and 6 are enlarged detailed perspective views of the parts of the locking means proper. Figure 7 is an enlarged detailed perspective view of a threaded collar used in connection with my improved device, and Figures 8, 9, 10, 11, 12 and 13 are views similar to Figures 1, 2, 3, 4, 5 and 6 respectively, illustrating a different embodiment of the invention.

In said drawings, referring first to Figures 1 to 7 inclusive, 10 denotes a dummy spindle or support which is permanently secured to the rear or other part of the automobile body, by any suitable means such as a plate 11 and bracket 12, in such a manner as to positively prevent removal of the dummy spindle 10 from the car body without the aid of special tools and destroying some part of the support or spindle. A wheel is indicated at 13, the same being of well-known form, being herein illustrated as of the disc type, provided with the usual hub 14. The wheel 13 is mounted on the dummy spindle in the manner shown in Figure 2, that is, with the free end of the spindle 10 projecting beyond the outer side of the hub. The projecting end of the spindle is threaded, as is customary for the reception of the usual clamping nut.

In carrying out my invention, as illustrated in Figures 1 to 7 inclusive, my improved anti-theft device is applied to the dummy spindle to retain the wheel in place thereon, the same being screwed on to the threaded end of the spindle, replacing the usual clamping nut.

The anti-theft device proper, as illustrated in Figures 1 to 7 inclusive, comprises broadly, a housing A; a nut or collar B; and a lock-mechanism C.

The housing A is preferably in the form of a casting of suitable heavy construction, the same comprising a hub like portion 15 provided with a pair of oppositely projecting, integral, radially disposed arms 16 and 17, the arms being preferably slightly inclined outwardly with reference to a plane at right angles to the axis of the hub. The hub 15 has a cylindrical socket 18 formed therein, adapted to receive the nut B. The arm 17 is hollow, being provided with an outwardly opening cylindrical socket 19 of relatively large diameter adapted to house the lock-mechanism C. The casting A is also provided with a bore 20 radial to the hub, communicating with the side of the socket 18 and the bottom of the socket 19. The bore 20 is of cylindrical cross section, of appreciably smaller diameter than the socket 19 and is disposed in axial alinement with the latter.

The nut B is in the form of a cylindrical sleeve having internal screw threads 21 adapted to coact with the usual threads at the outer end of the dummy spindle. The nut B is of an external diameter to loosely fit the socket 18 so as to turn freely therein. To retain the nut assembled with the housing A for free rotation within the socket, a split spring ring 22 is provided, the same being seated within alined annular grooves 23 and 24 formed respectively in the cylindrical wall of the socket and the exterior surface of the sleeve. The groove 24 is relatively deep, being of such a depth that the ring may be compressed and forced entirely into the same to clear the wall of the socket 18 when the nut is pushed into the same during the assembling of the parts. It will be evident that the ring is thus held under compression while the nut is being pushed into the socket, the ring being adapted to spring outwardly and snap into the groove 23 when it is brought into registration with the latter, thereby permanently holding the parts assembled. The groove 23 is relatively shallow, being of lesser depth than the thickness of the ring, so that the ring will project beyond the inner surface of the socket a sufficient distance to remain engaged with the groove 24. To prevent rattling of the nut, a split spring washer 25 is preferably interposed between the inner end of the nut and the bottom of the socket 18, the same being placed under slight compression when the parts are assembled to yieldingly maintain contact between the innermost side wall of the groove 24 and the ring 22. The friction created between the inner walls of the socket, nut and split ring washer by the expansive force of the latter is sufficient to prevent accidental turning of the housing A on the nut when the parts have been applied to the dummy spindle, whereby the housing is frictionally retained in position. The friction between these parts is considerably less than the friction between the threads on the nut end of the spindle when the nut is applied or removed, being insufficient to effect turning of the nut with the housing. The split spring washer thus serves the additional function of permitting the arms 16 and 17 of the housing to be left and retained in any desired position after the anti-theft device has been applied to the dummy spindle. The wall of the sleeve B is also provided with a plurality of openings 26—26 arranged in circular series, each adapted to be brought into registration with the bore 20 and adapted to receive the bolt or plunger member of the locking mechanism. In the present instance the sleeve is shown as provided with four equally spaced openings 26, but it will be evident that the number of openings may be varied within wide limits, it merely being necessary that the sleeve is provided with at least one such opening.

The locking mechanism C includes a pair of hollow cylindrical sleeves 27 and 28 and a plunger 29. The sleeve 28 is of an external diameter corresponding to the internal diameter of the sleeve 27 and is rigidly secured to the latter by means of inter-engaging lugs and arms 30 and 31 on the sleeves 28 and 27 respectively, each arm 31 engaging between two adjacent lugs 30 and having its end upset to prevent disengagement thereof. The lugs 30 have their outermost surfaces lying flush with the cylindrical outer surface of the sleeve 27 to form a continuation thereof. The two-part sleeve 27—28 is housed within the socket 19 and the portion 27 is of a diameter to loosely fit the socket so as to turn freely therein. At its outer end, the sleeve 27 is provided with an annular flange 32, the socket 19 being suitably counter bored as indicated at 33 to receive the same. To retain the two-part sleeve 27—28 within the socket, a split spring ring 34 engaging within registering annular grooves in the sleeve and the counter bored portion of the socket respectively is provided, the arrangement being in all respects similar to the retaining means for the nut B, consisting of the ring 22 and the grooves 23 and 24 hereinbefore described.

The sleeve section 27 carries the key operated mechanism proper of the lock which may be of any well known type, it being merely essential that rotation of the sleeve 27—28 is controlled by the key, in other words, that the sleeve 27—28 remains locked in fixed position until released by the insertion of the proper key, whereupon the sleeve may be rotated in the usual manner by the key to effect operation of the lock. The key operated mechanism herein shown is of a well known construction, being of the type including a plurality of spring pressed tumblers, some of which are normally laterally projected beyond the periphery of the sleeve to engage proper abutment means to prevent rotation of the sleeve and adapted to be withdrawn into the sleeve by the insertion of the key. As clearly shown in Figures 3 and 6, the sleeve section 27 is provided with a pair of diametrically opposed slots in which a plurality of laterally slidable, relatively thin plate tumblers 36 are adapted to work, certain of the tumblers being normally in projected position as clearly shown in Figure 3. The projected tumblers 36 are adapted to be withdrawn into the sleeve by a cooperating key 37 indicated in dotted lines in Figure 3, the key being inserted through the usual key slot at the outer end of the sleeve. The socket 19 is provided with diametrically opposed, longitudinal slots 38, either or both of which are adapted to receive the projected portions of the tumblers to prevent rotation of the sleeve 27—27 within the socket 19.

The plunger 29 includes a cylindrical head 39 and a relatively long, cylindrical stem 40 projecting therefrom. The stem 40 is slidably disposed within the sleeve section 30 and the latter is also mounted for rotation relatively to the stem. The head 39 of the plunger is adapted to work in the bore 20 of the housing, being guided therein for free sliding movement. A transverse pin 41 fixed in the housing A and projecting into the bore 20 and engaging and working within a longitudinal slot 42 in the head 39 prevents rotation of the plunger but permits reciprocation thereof. The plunger 29 is also provided with a laterally projecting pin 43 adapted to engage and work within a helical slot 44 formed in the sleeve section 28. It will be evident that as the plunger 29 is limited to longitudinal movement by means of the pin 41, rotation of the sleeve 27—28 relatively to the plunger will, through the medium of the slot and pin connection between the plunger and the sleeve 28, effect reciprocation of the plunger. The head of the plunger is adapted to be projected into one of the recesses 26 of the nut B to lock the nut to the housing. The engaging portion of the head of the plunger is preferably tapered as shown in Figures 3 and 4 to facilitate entrance thereof within the corresponding recess 26. As the extremity of the tapered head is of smaller diameter than the recess 26, the same will engage with a recess even if the latter is not truly registered therewith, and due to the camming action of the tapered portion of the head, the nut will be automatically turned until perfect registration is effected. With the plunger in the position shown in Figure 3, that is, withdrawn from the socket 18 into the bore 20, the nut B will be free to rotate within the socket 18. Upon rotation of the sleeve 27—28 by means of the key 27, the plunger 29 will be projected into the socket 18 and the head thereof into engagement with one of the recesses 26 of the nut B thereby locking the nut to the housing A for rotation therewith. The arms 16 and 17 of the housing A provide means for rotating the same.

To lock the spare wheel in position on the dummy spindle 10, the key is inserted within the lock C and rotated to project the plunger and effect engagement thereof with one of the recesses of the nut B, thereby locking the same to the housing A. The anti-theft device is then screwed onto the threaded outer end of the spindle 10 by rotating the housing by means of the projecting arms 16 and 17. The housing A is rotated until the nut B, which is compelled to rotate therewith, has been screwed home. Thereupon the key is turned so as to withdraw the plunger from engagement with the nut B and the key is then withdrawn. When the plunger has been withdrawn from engagement with the nut B, the housing will be rotatable independently of the nut, as the frictional resistance opposing turning of the nut, due to binding of the coacting threads of the nut and spindle and pressure of the nut on the wheel hub on which it bears, is many times greater than the friction between the nut and the housing, tending to cause the nut to turn therewith. Upon reference to Figure 3, it will be seen that the nut B protrudes a short distance beyond the hub of the housing A, thereby assuring engagement of the same with the end face of the wheel hub 14 and providing the proper clearance between the housing and the hub to prevent actual contact therebetween when the nut is screwed home. It will be evident that when the anti-theft device has been applied, access to the nut is not possible as the same is enclosed within the socket 18.

When it is desired to remove the spare wheel from the dummy spindle, the key is inserted within the lock and in case one of the openings 26 is not in registration with the plunger, the housing rotates until the plunger is brought into approximate registration with one of the openings 26 of the nut B, whereupon the key is rotated to project the plunger and again lock the nut to the housing. The housing may then be rotated to unscrew the same from the dummy spindle and the wheel removed.

Referring next to the embodiment of the invention illustrated in Figures 8 to 13 inclusive, 110 denotes a dummy spindle which is permanently secured to the rear or other suitable part of the automobile body, by a plate 111 and a bracket 112, these parts being in all respects similar to those shown in Figure 2. In the instance shown, the dummy spindle is provided with an extension 150 of rectangular cross section provided with an opening 126 adjacent the outer end thereof. The wheel which is mounted on the spindle is indicated at 113 and the hub thereof is designated by 114. The wheel 113 is mounted on the dummy spindle in the manner shown in Figure 2, that is, with the extension 150 at the free end of the spindle projecting beyond the front side of the hub. The projection 150 which extends beyond the outer face of the hub is adapted to receive the theft proof locking device.

The anti-theft device, proper, shown in Figures 8 to 14 inclusive, comprise broadly, a housing A' and a locking mechanism C'.

The housing A' is preferably in the form of a casting of suitable heavy construction, the same comprising a hub-like portion 115 provided with a pair of oppositely projecting, integral, radially disposed arms 116 and 117. The hub 115 of the housing A' has a socket 118 of substantially rectangular cross section formed therein, adapted to receive the projection 150 of the spindle. The arm 117 is hollow being provided with an outwardly opening cylindrical socket 119 in all respects similar to the socket 19 hereinbefore described. The casting A' is also provided with a bore 120 communicating with the side wall of the socket 118 and the bottom of the socket 119.

The locking mechanism C' which is disposed within the socket 119 of the arm 117 is in all respects similar to the locking mechanism C hereinbefore described and includes a two-part hollow sleeve 127—128 having a plunger 129 working therein. The sleeve 127—128 is provided with an annular flange 132 fitting within the counter bored portion 133 at the outer end of the socket, the flange and the counter bored portion being provided with alined, annular slots or grooves adapted to reecive the locking ring 134. The sleeve section 127 is provided with a plurality of sliding plates 136 adapted to be controlled by the key 137 and engaging within slots 138 in the socket 119. The plunger 129 is adapted to be reciprocated by means of the sleeve 127—128 upon rotation thereof through the medium of the pin 143 on the plunger 129 working in the helical slot 144 in the sleeve section 128, the plunger being held against rotation during its reciprocation by the pin 141 engaging within the longitudinal slot 142 formed in the head 139 of the plunger. The head 139 of the plunger is tapered in a manner similar to the head of the plunger 29 hereinbefore described and is adapted to engage within an opening 126 provided at the free end of the extension 150. To prevent rattling of the parts the socket has a bowed leaf spring 151 disposed therein at the side opposite the wall having the opening 120 therein, the spring having its opposite end fixed to the housing A' in any suitable manner and bearing on the side face of the extension 150.

To lock the wheel in position on the dummy spindle 110, the anti-theft device is applied to the extension 150 of the spindle, the latter being entered into the socket 118 and the opening 126 thereof registered with the bore 120 of the housing. The plunger is then projected by rotating the sleeve 127—128 through the medium of the key 137 and is engaged within the recess 126 of the bar, thereby locking the housing to the end of the dummy spindle. To permit removal of the wheel from the dummy spindle, the sleeve 127—128 is turned in the reverse direction to that just described, thereby withdrawing the plunger head from the opening 126, whereupon the anti-theft device may be bodily removed from the end of the spindle. In this connection, it is pointed out that the operation of the locking plunger in the embodiment of the invention just described is the reverse to that of the embodiment of the invention illustrated in Figures 1 to 7 inclusive, the plunger being retracted to its innermost position to effect locking of the anti-theft device shown in Figures 1 to 7 inclusive and the plunger being projected to lock the anti-theft device shown in Figures 8 to 14 inclusive.

As the ordinary method of affixing disc wheels to their hubs is by means of a plurality of removable bolts 151, (see Figs. 2 and 9), my anti-theft device, when used with such wheels, is preferably provided with a sheet metal shield 152, having a central aperture adapted to receive some part of the spindle or shaft, said shield being clamped between the locking device and the hub or spindle. The shape of the shield should be such that it extends over and about all of the removable bolts 151 with its edge in such close proximity to the parts of the wheel that the bolts are inaccessible for removal from that side of the wheel. The back side of the wheel is of course inaccessible, being disposed adjacent the body of the car.

I have herein shown and described what I now consider the preferred manner of carrying out my invention but the same is merely illustrative and I contemplate all changes and modifications that come within the scope of the claims appended hereto.

I claim:

1. In an anti-theft device for a wheel mounted on a support extending through the hub thereof and having a threaded end projecting beyond the outer side of the hub, the combination with a rotatable holder having a socket open at one end; a sleeve adapted to be screwed onto said threaded end, said sleeve being mounted within said socket and projecting outwardly through the opening thereof beyond the holder and having an end face adapted to be forced against the hub of the wheel when said sleeve is screwed home; and key-controlled means for locking said sleeve to the holder for rotation in unison therewith to effect tightening or loosening of said sleeve.

2. In an anti-theft device for a wheel mounted on a support extending through the hub thereof and having a threaded end portion projecting beyond the outer side of the hub; the combination with a nut adapted to be screwed onto said thread end to bring one end into abutment with the wheel to wedge the nut onto the threaded portion of support; of a holder having a pocket open at one end only in which said nut is mounted, said nut extending outwardly beyond the pocket to bear on the hub of the wheel, said nut being enclosed by said holder and the outer face of said hub when the holder is in position on the support; and a key-operated locking means mounted entirely within the holder and adapted to lock the nut to the holder for rotation therewith to effect tightening of the nut against the hub of the wheel.

3. In an anti-theft device for a wheel mounted on a support extending through the hub thereof and having one end projecting beyond the outer side of the hub, the combination with a holder having a socket; of freely movable retaining means within the socket adapted to be mounted on said support, the end of said support and means having interengaging wedge elements thereon, said movable means having an end abutment face, said socket having an unobstructed opening to permit the end face of said movable means to be brought into engagement with the exposed face of the wheel hub to effect locking wedging engagement of said wedge elements to retain the wheel on the support; and means for securing the holder to said movable means, whereby said retaining means may be forcibly moved bodily with the holder.

4. In an anti-theft device for a wheel, mounted on a support extending through the hub thereof and having a threaded end portion projecting beyond the outer side of the hub, the combination with a holder having a socket therein; of an internally threaded sleeve within said socket and protruding from said holder a sufficient distance to engage the hub of the wheel and space the holder from said hub, said sleeve being freely rotatable in said holder and having a lateral opening; a reciprocating plunger mounted on the holder and adapted to be projected into the opening of said sleeve to lock the holder thereto, whereby the sleeve may be screwed onto said threaded end of the support into engagement with the wheel hub to wedge the threads of said sleeve and support together and positively retain the wheel in position on the support; and key controlled means for effecting movement of said plunger to either project the same into said opening of the sleeve or retract the same to withdraw it from the opening.

5. In an anti-theft spare wheel device, the combination with a holder having a socket therein opening at one end; of a threaded element rotatably mounted in said socket and adapted to be attached to a threaded support for a wheel, said element fitting said socket and having one end thereof exposed through said opening; means disposed inwardly of the end of said element and socket for retaining said element within the socket; and a yielding member interposed between the inner end of said member and the inner end of the socket and having frictional contact with said member and holder.

6. A theft preventing device comprising a body, a blind bore therein, an internally threaded sleeve occupying said bore, an internal annular groove formed in the body, an external annular groove formed in said sleeve and disposed in registry with the aforesaid groove, a split ring occupying both of said grooves and preventing withdrawal of said sleeve from the body without preventing relative rotation between them, means carried by the body for locking said body and sleeve against relative rotation, and spring means acting between the sleeve and the blind end of said body bore adapted to eliminate rattle between the sleeve and associated parts and to brake relative rotary movement between the body and sleeve.

7. In a theft preventing device, the combination of a shaft having a shoulder and threads at one end, with a wheel having its hub mounted on said shaft, means for preventing the removal of said wheel from the other end of said shaft, a casing having means formed thereon for rotating said casing, a threaded member complementary to the threaded end of said shaft, rotatably mounted in said casing, held against axial movement therein and slightly protruding from said casing, said complementary member having a shoulder exposed to engage said hub, and substantially all of said complementary member being enclosed when said latter shoulder is in engagement with said hub, and lockable means in said casing for fixing said casing and complementary threaded member to turn together or to rotate freely relative to each other.

8. In a theft preventing device, the combination of a shaft having a shoulder and threads at one end, with a wheel having its hub mounted on said shaft, means for preventing the removal of said wheel from the other end of said shaft, a casing having means formed thereon for rotating said casing, a threaded member complementary to the threaded end of said shaft, rotatably mounted in said casing and held against axial movement therein, said complementary member having a shoulder exposed to engage said hub, and substantially all of said complementary member being enclosed when the latter shoulder is in engagement with said hub, but said casing being out of frictional engagement with said hub, and key actuated means in said casing for causing said casing and complementary member to turn together or to rotate freely relative to each other.

9. In a theft preventing device, the combination of a shaft having a shoulder and threads at one end, with a disc wheel carried by a hub with removable fastening means, said hub being mounted on said shaft, means for preventing the removal of said wheel from the other end of said shaft, a casing having means formed thereon for rotating said casing, a threaded member complementary to the threaded end of said shaft, rotatably mounted in said casing, held against axial movement therein and slightly protruding from said casing, said complementary member having a shoulder exposed to engage said hub, and substantially all of said complementary member being enclosed when said later shoulder is in engagement with said hub, lockable means in said casing for fixing said casing and complementary threaded member to turn together or to rotate freely relative to each other, and an annular shield having a central aperture to receive one of said threaded members, and an exterior edge adapted to cooperate with said wheel to enclose the adjacent ends of said removable fastening means.

10. In a theft preventing device for automobile spare parts, the combination of a support having a threaded bolt projecting therefrom to retain a spare part, with a holder having a socket therein, an internally threaded sleeve within said socket and protruding from said holder a sufficient distance to engage a spare part and space the holder from said part, said sleeve being freely rotatable in said holder and having a pair of opposed shoulders, a reciprocating plunger carried by said holder and adapted to be projected between said shoulders to prevent relative rotation between said holder and sleeve, whereby said sleeve may be screwed on the threaded end of said bolt into engagement with said spare part to wedge the threads of said sleeve and support together and positively retain the spare part on said support and key controlled means for effecting movement of said plunger to either project the same between said shoulders or to retract the same to withdraw it from the opening.

11. In a theft preventing device the combination of a holder having a socket therein, a threaded member rotatably mounted in said socket and protruding from said holder to engage a spare part and space the holder from said part, said member having a pair of opposed shoulders within said holder, and key actuated means carried by said holder for movement between said shoulders to prevent relative rotation between said holder and member, whereby said member may be screwed into wedging engagement with a spare part or said member may be released for free rotation in said holder.

12. In a theft preventing device the combination of a casing having a socket therein, a threaded member rotatably mounted in said socket, said member projecting from said socket and having a pair of opposed shoulders in said socket, a plunger adapted to be projected between said shoulders, and key actuated means for withdrawing said plunger from engagement with said shoulders whereby said casing may be locked to said member to rotate the same into wedging engagement with a spare-part or said casing may be made freely rotatable on said member.

13. A lock comprising: a bolt; a nut threaded on said bolt; said bolt passing through said nut; a casing surrounding said nut and free to rotate with relation thereto; means for securing said casing around said nut; key-operated means for locking said casing on said nut so that said nut may be unscrewed by turning said casing, said key-operated means comprising a locking bolt sliding in said casing and adapted to engage said nut; and means for sliding said locking bolt into, or out of, engagement with said nut.

14. The combination with a securing nut, of a housing open at one end and adapted to be applied endwise to the nut, means for securing the housing to the nut to prevent endwise separation thereof, and spring operating means to prevent rattling of the housing after it has been applied.

15. The combination with a securing nut, of a housing therefor, adapted to cover the nut, means for preventing endwise separation of the housing from the nut, and anti-rattling devices concealed by the housing and arranged to prevent rattling of the latter after it has been applied to the nut.

16. The combination with a securing nut, of a housing therefor open at one end and closed at its opposite end, whereby it is adapted to be placed over the nut by endwise movement, means for securing the housing to the nut to prevent endwise separation thereof, and anti-rattling devices within the housing located between the housing and the nut.

17. The combination with a securing nut, of a housing having an open end to receive a threaded member in said nut, and adapted to prevent access to said nut, with means for retaining said housing on said nut and resilient means for preventing rattling of said housing relative to said nut.

18. The combination of a threaded member having a shoulder for use in turning said member with a housing carried by said threaded member and preventing access to the same, and resilient means for preventing rattling of said housing relative to said threaded member.

19. In a theft preventing device, the combination of a casing having a socket therein, a threaded member adapted to rotate in said socket, said member having an exposed surface for frictionally engaging a part to be secured by said device, key actuated means carried by said casing for selectively engaging said threaded member to rotate the same by means of said casing, a spare part having a threaded member complementary to said first mentioned threaded member, and a spare part on said support secured by said first mentioned member.

20. In a spare part lock, the combination of a removable securing member adapted to secure a spare part to a support, with a casing member for enclosing and protecting said securing member, means for securing said casing on said securing member, and a resilient anti-ratting device carried by said casing and engaging said securing memebr to prevent rattling of said casing.

21. In a spare part lock, the combination of a threaded member for securing a spare part to a support, a casing for preventing access to said threaded member, means for securing said casing in position to protect said threaded member and resilient means tensioned between said casing and threaded member for preventing rattling of said casing relative to said threaded member.

22. In a spare part lock for automobiles and the like, the combination of a threaded member adapted to secure a spare part to a support by threading said member into wedging engagement with other parts, said threaded member having an annular groove in the same, a casing member for enclosing and preventing access to said threaded member, means carried by said casing for engaging in said annular groove to secure said casing on said threaded member, and a resilient member tensioned between a part of said casing and a part of said threaded member to prevent rattling of said casing.

In witness that I claim the foregoing I have hereunto subscribed my name this 12th day of November, 1923.

RAY W. JOHNSON.